United States Patent
Asami et al.

(10) Patent No.: US 11,541,361 B2
(45) Date of Patent: Jan. 3, 2023

(54) DISPERSION METHOD AND DISPERSION APPARATUS FOR MATERIAL TO BE PROCESSED AND METHOD FOR PRODUCING MIXED LIQUID OF MATERIAL TO BE PROCESSED AND DISPERSION MEDIUM PRODUCED THEREBY

(71) Applicants: NIHON SPINDLE MANUFACTURING CO., LTD., Hyogo (JP); UNIVERSITY OF HYOGO, Hyogo (JP); KABUSHIKI KAISHA DAINICHI SEISAKUSHO, Hyogo (JP)

(72) Inventors: Keiichi Asami, Hyogo (JP); Yoshihiro Oka, Hyogo (JP); Yoshimi Nishimura, Kyoto (JP); Tomohiro Hashimoto, Hyogo (JP); Katsuhiko Yonezawa, Hyogo (JP)

(73) Assignees: NIHON SPINDLE MANUFACTURING CO., LTD., Hyogo (JP); UNIVERSITY OF HYOGO, Hyogo (JP); KABUSHIKI KAISHA DAINICHI SEISAKUSHO, Hyogo (JP)

(*) Notice: Subject to any disclaimer, the term of this patent is extended or adjusted under 35 U.S.C. 154(b) by 503 days.

(21) Appl. No.: 15/665,208

(22) Filed: Jul. 31, 2017

(65) Prior Publication Data

US 2017/0341040 A1 Nov. 30, 2017

Related U.S. Application Data

(63) Continuation of application No. PCT/JP2016/052860, filed on Feb. 1, 2016.

(30) Foreign Application Priority Data

Feb. 13, 2015 (JP) .............................. JP2015-025933

(51) Int. Cl.
*B01F 23/50* (2022.01)
*B01F 23/53* (2022.01)
(Continued)

(52) U.S. Cl.
CPC ............ *B01F 23/511* (2022.01); *B01F 23/53* (2022.01); *B01F 23/55* (2022.01); *B01F 23/64* (2022.01);
(Continued)

(58) Field of Classification Search
CPC .... B01F 3/1214; B01F 3/1221; B01F 3/1235; B01F 5/104; B01F 5/106; B01F 23/511;
(Continued)

(56) References Cited

U.S. PATENT DOCUMENTS 7,067,204 B2 6/2006 Nomura et al.
10,494,274 B2 * 12/2019 Asami ................ B01D 17/0217
(Continued)

FOREIGN PATENT DOCUMENTS

JP H09-194669 A 7/1997
JP 2004-152523 A 5/2004
(Continued)

OTHER PUBLICATIONS

Machine translation of JP 2010222189, published 2010, accessed via https://worldwide.espacenet.com/ on Sep. 26, 2019.*
(Continued)

*Primary Examiner* — Marc C Howell
(74) *Attorney, Agent, or Firm* — Michael Best & Friedrich LLP

(57) ABSTRACT

In order to provide a dispersion method and a dispersion apparatus capable of mixing a material to be processed and
(Continued)

a dispersion medium having no affinity with each other using a single apparatus without using a dispersant, there are provided a quantitative supply mechanism quantitatively supplying a material to be processed, a suction stirring mechanism primarily including a suction stirring pump in which the material to be processed and a dispersion medium are subjected to negative pressure suction by a negative pressure suction force generated by rotation of a rotating blade and the suctioned material to be processed and the dispersion medium are stirred and mixed by the rotating blade and are allowed to pass through a throttle passage to cause cavitation, and a plasma generating mechanism generating a plasma in bubbles formed due to cavitation in a mixed liquid of the material to be processed and the dispersion medium.

6 Claims, 12 Drawing Sheets

(51) Int. Cl.
   *B01F 23/64* (2022.01)
   *B01F 25/52* (2022.01)
   *B01F 25/53* (2022.01)
   *B01F 25/64* (2022.01)
   *B01F 35/71* (2022.01)
   *B01J 19/08* (2006.01)

(52) U.S. Cl.
   CPC .............. *B01F 25/52* (2022.01); *B01F 25/53* (2022.01); *B01F 25/64* (2022.01); *B01F 35/71411* (2022.01); *B01F 35/71775* (2022.01); *B01J 19/088* (2013.01); *B01J 2219/0884* (2013.01); *B01J 2219/0894* (2013.01)

(58) Field of Classification Search
   CPC .......... B01F 23/53; B01F 23/55; B01F 25/52; B01F 25/53; B01J 2219/0894; B01J 2219/0896; B01J 2219/0898
   USPC ......................................................... 366/348
   See application file for complete search history.

(56) References Cited

U.S. PATENT DOCUMENTS

| | | | |
|---|---|---|---|
| 2006/0054489 A1* | 3/2006 | Denes .................... | B01J 19/088 204/164 |
| 2009/0159461 A1* | 6/2009 | McCutchen ........... | B01J 19/088 205/751 |
| 2014/0241108 A1* | 8/2014 | Stoppler ................. | B01F 5/102 366/137 |

FOREIGN PATENT DOCUMENTS

| | | | |
|---|---|---|---|
| JP | 2006-281017 A | | 10/2006 |
| JP | 2008-173521 A | | 7/2008 |
| JP | 2009-190003 A | | 8/2009 |
| JP | 2010-222189 A | | 10/2010 |
| JP | 2010222189 A | * | 10/2010 |
| JP | 2011-183270 A | | 9/2011 |
| JP | 2012-011313 A | | 1/2012 |
| JP | 2012-101140 A | | 5/2012 |
| JP | 2012-200722 A | | 10/2012 |
| JP | 2013-034914 A | | 2/2013 |

OTHER PUBLICATIONS

Takuya Ishizuka et al., "Development of aqueous slurry including CNT by Mechanical Dispersion (Mechanical Bunsan ni yoru Lithium Ion Niji Denchi-yo Suikei CNT Gan'yu Slurry no Sakusei to Denkyoku Hyoka)", Abstracts, Battery Symposium In Japan Dai 55 Kai, Nov. 19, 2014 (Nov. 19, 2014), p. 59, Yoshiharu Uchimoto, The committee of Battery Technology, The Electrochemical Society of Japan, Japan.

International Search Report issued in Application No. PCT/JP2016/052860, dated Apr. 26, 2016.

* cited by examiner

DISPERSION METHOD AND DISPERSION APPARATUS FOR MATERIAL TO BE PROCESSED AND METHOD FOR PRODUCING MIXED LIQUID OF MATERIAL TO BE PROCESSED AND DISPERSION MEDIUM PRODUCED THEREBY

RELATED APPLICATIONS

Priority is claimed to Japanese Patent Application No. 2015-025933, filed Feb. 13, 2015, and International Patent Application No. PCT/JP2016/052860, the entire content of each of which is incorporated herein by reference.

BACKGROUND

Technical Field

Certain embodiments of the present invention relate to a dispersion method and a dispersion apparatus for a material to be processed, and a mixed liquid of the material to be processed and a dispersion medium produced thereby, and more particularly, to a dispersion method and a dispersion apparatus for a material to be processed in which a plasma is generated in bubbles formed in a mixed liquid of the material to be processed and a dispersion medium to promote dispersion of the material to be processed, and a method for producing a mixed liquid of the material to be processed and the dispersion medium produced thereby.

Description of Related Art

In the related art, various in liquid plasma processing apparatuses which are configured to perform a process of modifying a material to be processed, by generating a plasma in bubbles formed in a liquid have been proposed.

In addition, dispersion apparatuses which perform a process of dispersing a material to be processed, using a suction stirring pump in which the material to be processed and a dispersion medium are subjected to negative pressure suction by a negative pressure suction force generated by rotation of a rotating blade, and the suctioned material to be processed and the dispersion medium are stirred and mixed by the rotating blade and are allowed to pass through a throttle passage to cause cavitation have been proposed.

SUMMARY

According to an embodiment of the present invention, there is provided a dispersion method for a material to be processed including: generating, by a plasma generating mechanism, a plasma in bubbles formed in a mixed liquid of a material to be processed and a dispersion medium by stirring and mixing the material to be processed and the dispersion medium with a rotating blade, thereby promoting dispersion of the material to be processed.

According to another embodiment of the present invention, for embodying the dispersion method for a material to be processed, there is provided a dispersion apparatus for a material to be processed including: a suction stirring pump in which a material to be processed and a dispersion medium are subjected to negative pressure suction by a negative pressure suction force generated by rotation of a rotating blade, and the suctioned material to be processed and the dispersion medium are stirred and mixed by the rotating blade and are allowed to pass through a throttle passage to cause cavitation; and a plasma generating mechanism which generates a plasma in bubbles formed due to the cavitation in a mixed liquid of the material to be processed and the dispersion medium.

According to still another embodiment of the present invention, there is provided a method for producing a mixed liquid of a material to be processed and a dispersion medium, the method including: producing a mixed liquid of a material to be processed and a dispersion medium by generating a plasma in bubbles formed in the mixed liquid of the material to be processed and the dispersion medium when the material to be processed and the dispersion medium are stirred and mixed, according to the dispersion method for a material to be processed.

BRIEF DESCRIPTION OF THE DRAWINGS

FIG. 1A is a schematic configuration view, and FIG. 1B is an explanatory view of a plasma generating mechanism.

DETAILED DESCRIPTION

Figure 1B:
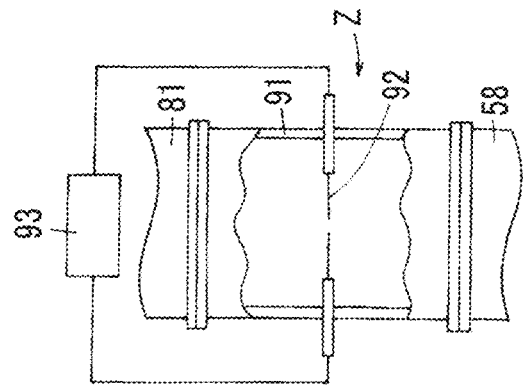
FIGS. 1A and 1B illustrate an example of a dispersion apparatus for a material to be processed according to an embodiment of the present invention, where

In the in-liquid plasma processing apparatus in the related art, plasma processing is performed on the material to be processed in a substantially sealed container, and the dispersion apparatus simply stirs and mixes the material to be processed and the dispersion medium. Therefore, in a case where either of the apparatuses is singly used, it is difficult to mix the material to be processed and the dispersion medium having no affinity with each other (for example, a carbon material and water) without the use of a dispersant (uniformly disperse the material to be processed in the dispersion medium).

It is desirable to provide a dispersion method and a dispersion apparatus capable of mixing a material to be processed and a dispersion medium having no affinity with each other using a single apparatus without the use of a dispersant, and a method for producing a mixed liquid of the material to be processed and the dispersion medium produced thereby.

Cavitation may be caused by stirring and mixing the material to be processed and the dispersion medium with a rotating blade, thereby forming bubbles in the mixed liquid of the material to be processed and the dispersion medium.

In addition, cavitation may be caused by stirring and mixing the material to be processed and the dispersion medium with the rotating blade at a reduced pressure.

A plasma generating mechanism may be connected to a discharge portion of a suction stirring pump for the mixed liquid of the material to be processed and the dispersion medium.

In addition, the mixed liquid of the material to be processed and the dispersion medium mixed by the suction stirring pump may be circulated through the suction stirring pump via a circulation passage.

The material to be processed may be a carbon material, and the dispersion medium may be water. Alternatively, the material to be processed may be an inorganic compound, for example, one or two or more of titanium oxide, aluminum oxide, calcium carbonate, potassium nitride, boron nitride, and zirconium dioxide, and the dispersion medium may be water.

According to the embodiments of the dispersion method and the dispersion apparatus for a material to be processed and the method for producing a mixed liquid of a material to be processed and a dispersion medium produced thereby, cavitation is particularly caused by stirring and mixing the material to be processed and the dispersion medium with the rotating blade in bubbles formed in the mixed liquid of the material to be processed and the dispersion medium by stirring and mixing the material to be processed and the dispersion medium with the rotating blade, and a plasma is generated by the plasma generating mechanism in bubbles correspondingly formed in the mixed liquid of the material to be processed and the dispersion medium. Accordingly, hydroxyl groups, oxygen radicals, and the like are generated in the liquid, and these hydroxyl groups, oxygen radicals, and the like adhere to the surface of the material to be processed to modify the material to be processed to have an affinity with the dispersion medium, so that the material to be processed and the dispersion medium having no affinity with each other can be mixed using a single apparatus without the use of a dispersant (the material to be processed is uniformly dispersed in the dispersion medium).

In addition, cavitation is reliably caused by stirring and mixing the material to be processed and the dispersion medium with the rotating blade at a reduced pressure, and thus bubbles can be formed in the mixed liquid of the material to be processed and the dispersion medium.

Hereinafter, embodiments of a dispersion method and a dispersion apparatus for a material to be processed and a method for producing a mixed liquid of a material to be processed and a dispersion medium produced thereby according to embodiments of the present invention will be described with reference to the drawings.

As illustrated in FIGS. 1A to 5, the dispersion apparatus for a material to be processed is configured to include a quantitative supply mechanism X which quantitatively supplies a material to be processed P (which may contain an arbitrary solute as necessary), a suction stirring mechanism Y primarily including a suction stirring pump 50 in which the material to be processed P and a dispersion medium R are subjected to negative pressure suction by a negative pressure suction force generated by rotation of a rotating blade 51, the suctioned material to be processed P and the dispersion medium R are stirred and mixed by the rotating blade 51 and are allowed to pass through a throttle passage W to cause cavitation, and a plasma generating mechanism Z which generates a plasma in bubbles formed due to the cavitation in a mixed liquid of the material to be processed P and the dispersion medium R.

Figure 1A:
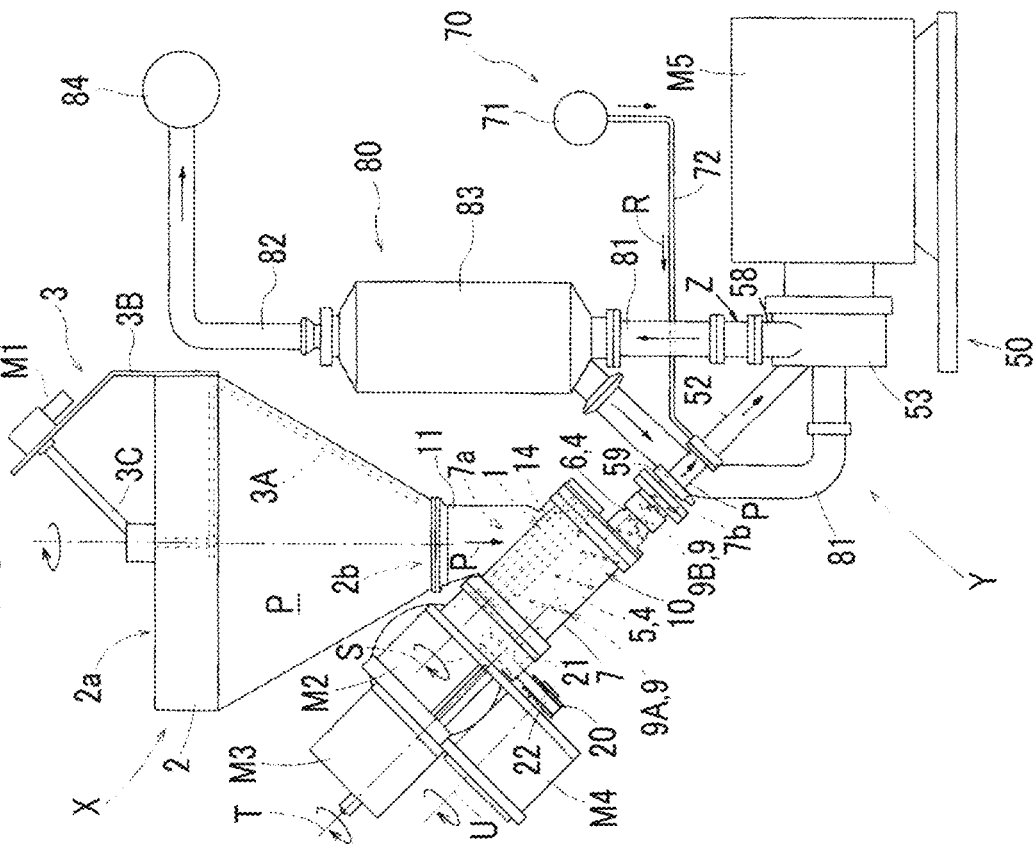

Specifically, as illustrated in FIGS. 1A and 1B, the dispersion apparatus for a material to be processed is configured to include the quantitative supply mechanism X which quantitatively supplies the material to be processed P, a dispersion medium supply device 70 which quantitatively supplies the dispersion medium R, the suction stirring pump 50 in which the material to be processed P quantitatively supplied from the quantitative supply mechanism X and the dispersion medium R quantitatively supplied from the dispersion medium supply device 70 are subjected to negative pressure suction and are stirred and mixed, the plasma generating mechanism Z which generates a plasma in bubbles formed due to cavitation in the dispersion medium R (mixed liquid) in which the material to be processed P discharged from the suction stirring pump 50 is dispersed, and a separation device 80 which separates the dispersion medium R containing the material to be processed P, which is incompletely dispersed, and the dispersion medium R containing the material to be processed P, which is completely dispersed, from each other on the downstream side thereof.

The quantitative supply mechanism X is a device having a volumetric quantitative supply mechanism 1 which quantitatively supplies a predetermined amount of the material to be processed P to the suction stirring pump 50.

Specifically, the quantitative supply mechanism X includes a hopper 2 which is formed in an inverted cone shape having a diameter decreasing from the top toward the bottom and discharges the material to be processed P received from an upper opening 2a from a lower opening 2b, a stirring mechanism 3 in which the material to be processed P in the hopper 2 is stirred by a stirring blade 3A as a stirring member disposed in the hopper 2, and a casing 7 which defines a receiving space 4 and defines a material to be processed receiving portion 5 which receives the material to be processed P from the quantitative supply mechanism 1 in the receiving space 4, and a material to be processed delivery portion 6 which delivers the material to be processed P from the material to be processed receiving portion 5.

In the casing 7, the volumetric quantitative supply mechanism 1 which quantitatively supplies the material to be processed P discharged from the lower opening 2b by negative pressure suction of the suction stirring pump 50 connected to the downstream side of the lower opening 2b, to the suction stirring pump 50, and a forcible supply mechanism 10 which forcibly supplies the material to be processed P received to the material to be processed receiving portion 5 toward the suction stirring pump 50 side via a material to be processed delivery port 7b of the material to be processed delivery portion 6 by rotation of a screw 9, which is disposed across the material to be processed receiving portion 5 and the material to be processed delivery portion 6 so as to be rotatable and has a helical blade portion 8 on the outer circumference, in the receiving space 4 into which the material to be processed P quantitatively supplied from the quantitative supply mechanism 1 is received.

Hereinafter, the quantitative supply mechanism X will be described first, and the suction stirring mechanism Y will be described subsequently.

Although the material to be processed P is not particularly excluded as long as the material to be processed P is a material to be processed, examples thereof include a chemical raw material such as a battery electrode material, and more specifically, carbon materials such as CNT (carbon nanotubes) and acetylene black. Examples of the form thereof include powdery, granulated, granular, and fine granular forms.

There may be cases where the material to be processed P contain an arbitrary solute, for example, a thickener such as CMC (carboxymethyl cellulose), as necessary.

In addition, the dispersion medium R is not particularly excluded as long as the dispersion medium R is a dispersion medium (may also be a material having no affinity with the material to be processed P) in which the material to be processed P is dispersed, and for example, a liquid or liquid material may be used.

In this embodiment, for example, the material to be processed P is a mixture of CNT (carbon nanotubes) and CMC (carboxymethyl cellulose), and the dispersion medium R is water.

Quantitative Supply Mechanism X

As illustrated in FIGS. 1A to 3, the hopper 2 is formed in an inverted cone shape that decreases in diameter from the top toward the bottom, and is configured to store the material to be processed P received from the upper opening 2a which is open to the atmosphere and discharge the material to be processed P from the lower opening 2b.

The transverse sectional shapes (in a top view) of the upper opening 2a and the lower opening 2b are circular, and the upper opening 2a is formed to have a larger diameter than that of the lower opening 2b.

The inclination angle of an inner wall surface 2A having an inverted cone shape is approximately 60 degrees with respect to the horizontal plane.

It is also possible to adopt a configuration in which the upper opening 2a is sealed by a lid (not illustrated) or the like.

The lower opening 2b is formed at the lower end portion of the inner wall surface 2A of the hopper 2, and a connecting flange portion 12 which can be connected to a connecting flange portion 13 formed at the upper end portion of an introduction portion 11 interposed between the lower end portion of an outer wall surface 2B and the quantitative supply mechanism 1 is formed at the lower end portion of the outer wall surface 2B.

The connecting flange portions 12 and 13 are nipped and fixed by a bracket (not illustrated) which nips both the connecting flange portions 12 and 13 in the vertical direction.

The introduction portion 11 is formed in an inverted triangular pyramid shape which causes the lower opening 2b of the hopper 2 and a material to be processed supply port 7a formed at the upper portion of the casing 7 to communicate with each other.

A slit-like opening having the same shape as the material to be processed supply port 7a of the casing 7 is formed at the lowermost end of the introduction portion 11 having the inverted triangular pyramid shape.

Figure 2:
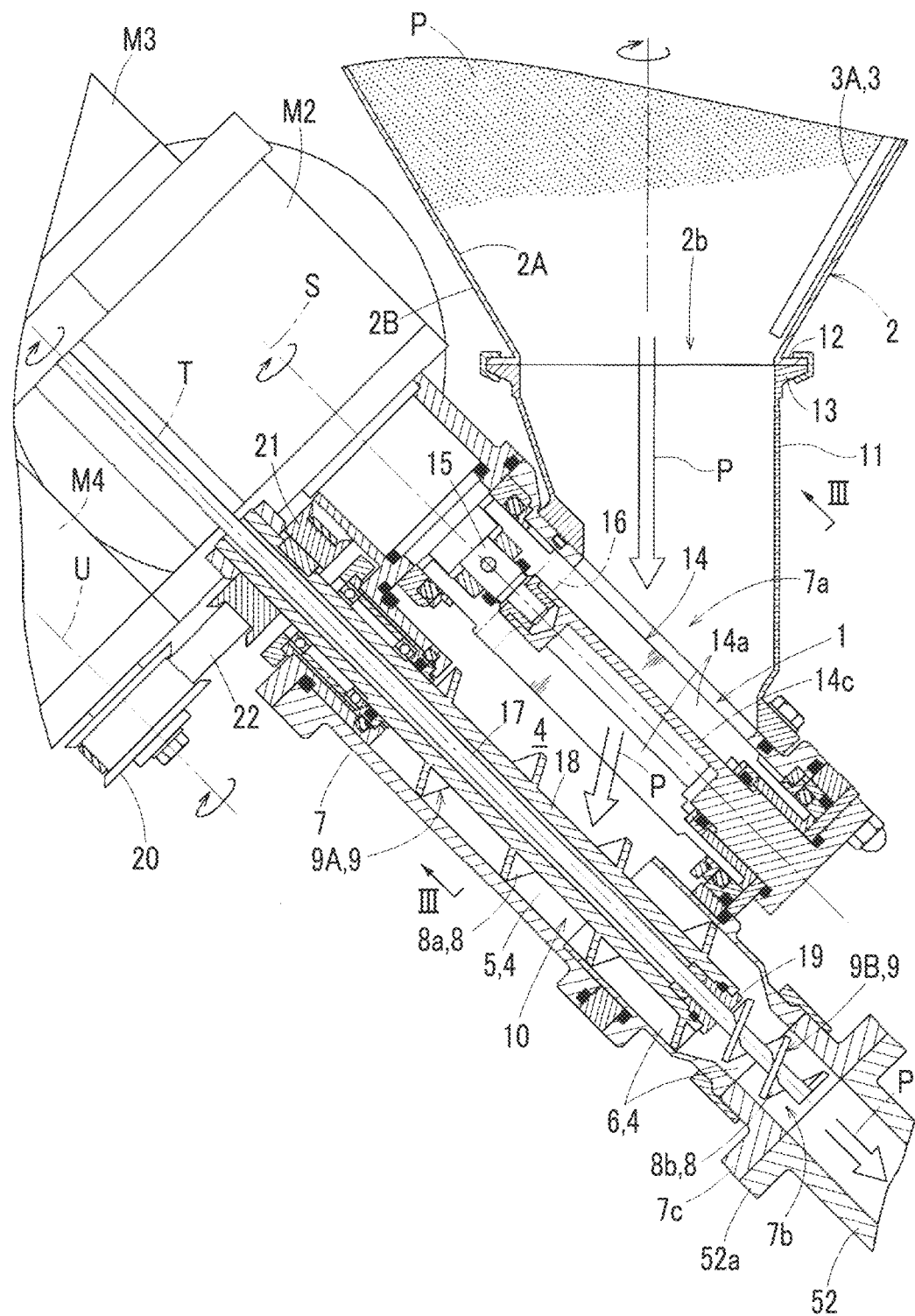
FIG. 2 is a partial enlarged sectional view illustrating a main part of a quantitative supply mechanism.

The introduction portion 11 having the inverted triangular pyramid shape is formed in an approximately isosceles triangle shape having the wall surface on the right in FIG. 2 as the bottom side and two sides connected to the bottom side, and the slit-like opening is formed in a direction from the vertex where the two sides intersect toward the midpoint of the bottom side.

Furthermore, the shape of the slit-like opening can be appropriately set depending on the size of the hopper 2, the supply amount of the material to be processed P, the characteristics of the material to be processed P, and the like.

The introduction portion 11 and the casing 7 are fixed and connected by bolts (not illustrated).

The stirring mechanism 3 is configured to include the stirring blade 3A which stirs the material to be processed P in the hopper 2, a blade driving motor M1 which rotates the stirring blade 3A about the center axis of the hopper 2, a mounting member 33 which fixes the blade driving motor M1 to the outer wall surface 2B in the upper opening 2a of the hopper 2, and a transmission member 3C which transmits the rotational driving force of the blade driving motor M1 to the stirring blade 3A.

The stirring blade 3A is a rod-like member formed in a substantially L shape in a longitudinal sectional view, and is disposed so that the longitudinal direction thereof is in a state of following the inner wall surface 2A of the hopper 2 and the transverse direction thereof is coaxial with the center axis.

In addition, the transverse sectional shape of the stirring blade 3A is formed in a triangular shape, and a surface forming one side of the triangle is disposed to be substantially parallel to the inner wall surface 2A of the hopper 2.

Accordingly, the stirring blade 3A is disposed so as to be rotatable about the center axis along the inner wall surface 2A of the hopper 2.

As illustrated in FIGS. 1A to 4, the casing 7 is formed in a substantially rectangular shape and is connected to the hopper 2 in a posture inclined by 45 degrees with respect to the horizontal direction via the introduction portion 11.

The upper surface of the casing 7 is provided with the slit-like material to be processed supply port 7a corresponding to the slit-like opening of the introduction portion 11 such that the material to be processed P can be supplied from the lower opening 2b of the hopper 2 into the casing 7.

The lower portion of the right surface of the casing 7 is provided with the material to be processed delivery port 7b which delivers the material to be processed P quantitatively supplied to the quantitative supply mechanism 1 to the suction stirring mechanism Y side on the downstream side via the receiving space 4.

In addition, at a point where the material to be processed delivery port 7b of the casing 7 is formed, a connecting flange portion 7c which can be connected to a connecting flange portion 52a of a mixing nozzle 52 (an example of a suction mixing portion), which will be described later, is formed.

In the casing 7, the quantitative supply mechanism 1 is disposed immediately downstream of the material to be processed supply port 7a, and the receiving space 4 is formed immediately downstream of the quantitative supply mechanism 1.

The receiving space 4 is formed by the material to be processed receiving portion 5 formed on the upstream side and the material to be processed delivery portion 6 formed on the downstream side.

In addition, the receiving space 4 is maintained at a lower pressure (for example, about −0.09 MPa) than the material to be processed supply port 7a by the negative pressure suction force exerted via the material to be processed delivery port 7b.

That is, the material to be processed delivery port 7b is connected to the primary side of the suction stirring pump 50 of the suction stirring mechanism Y such that the negative pressure suction force is exerted on the receiving space 4 and the receiving space 4 is maintained in a state at a lower pressure than the material to be processed supply port 7a.

The volumetric quantitative supply mechanism 1 is a mechanism which quantitatively supplies a predetermined amount of the material to be processed P supplied from the lower opening 2b of the hopper 2 to the receiving space 4 formed on the downstream side of the quantitative supply mechanism 1 in the casing 7.

Specifically, the quantitative supply mechanism 1 includes a measuring rotating body 14 which is disposed so as to be rotatable on the immediately downstream side of the material to be processed supply port 7a in the casing 7, and a measuring rotating body driving motor M2 which rotatably drives the measuring rotating body 14 about a rotation axis S.

Figure 3:
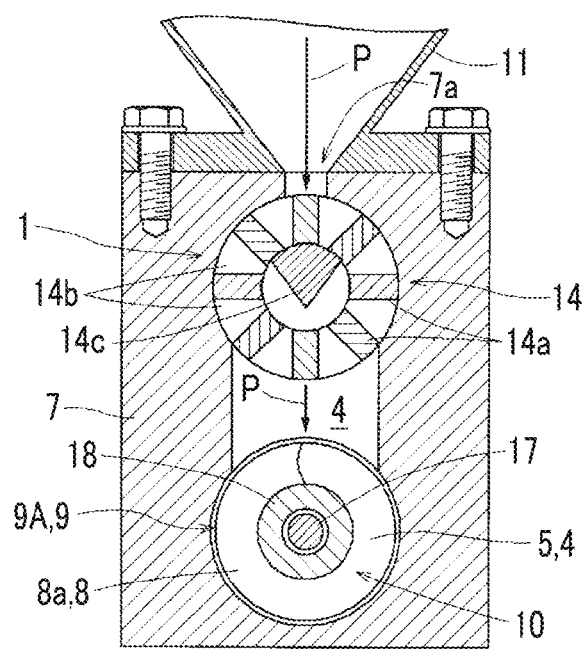
FIG. 3 is a schematic sectional view taken along the direction in III-III in FIG. 2.

As illustrated in FIGS. 2 and 3, the measuring rotating body 14 is configured so that a plurality of (for example, eight) plate-like partition walls 14a are attached to a disc member 16 disposed on a driving shaft 15 of the measuring rotating body driving motor M2 excluding the center portion of the disc member 16 at equal intervals in a radial direction and a plurality of (for example, eight) material to be processed accommodation chambers 14b are defined at equal intervals in a circumferential direction.

The material to be processed accommodation chambers 14b are configured to be open to the outer circumferential surface and the center portion of the measuring rotating body 14.

An opening closing member 14c is disposed in the center portion of the measuring rotating body 14 so as to be eccentric in the circumferential direction and is configured so that the opening of each of the material to be processed accommodation chambers 14b on the center portion side is closed or opened according to the rotational phase thereof.

The amount of the material to be processed P supplied to the receiving space 4 can be adjusted by changing the rotation speed of the measuring rotating body 14 by the measuring rotating body driving motor M2 which rotatably drives the measuring rotating body 14.

Each of the material to be processed accommodation chambers 14b is configured to be repeatedly changed in state by the rotation of the measuring rotating body 14 in the order of a receiving space open state of being open to the receiving space 4, a first closed state of not communicating with the receiving space 4 and the material to be processed supply port 7a, a supply port open state of being open to the material to be processed supply port 7a, and a second closed state of not communicating with the material to be processed supply port 7a and the receiving space 4.

The state of each of the material to be processed accommodation chambers 14b is changed to a negative pressure state (for example, about −0.09 MPa) and a high pressure state higher than the negative pressure state by the rotation of the measuring rotating body 14.

The casing 7 is formed so that the opening of the measuring rotating body 14 on the outer circumferential surface side is closed in the first closed state and the second closed state, and the opening closing member 14c is fixed to the casing 7 so that the opening of the measuring rotating body 14 on the center portion side is closed in the first closed state, the supply port open state, and the second closed state.

Therefore, in the quantitative supply mechanism X, basically, the material to be processed P stored in the hopper 2 is supplied to the quantitative supply mechanism 1 while being stirred by the stirring blade 3A, and is quantitatively supplied to the suction stirring pump 50 by the quantitative supply mechanism 1 via the lower opening 2b of the hopper 2 and the receiving space 4 and the material to be processed delivery port 7b of the casing 7.

More specifically, the pressure of the receiving space 4 in the casing 7 is in a negative pressure state (for example, about −0.09 MPa) by the negative pressure suction force exerted from the suction stirring pump 50 connected to the downstream side of the material to be processed delivery port 7b of the quantitative supply mechanism 1.

On the other hand, since the upper opening 2a of the hopper 2 is open to the atmosphere, the inside of the hopper 2 is in a state at about atmospheric pressure.

The inside of the introduction portion 11 and the vicinity of the lower opening 2b which communicate with each other via the gap between the receiving space 4 and the measuring rotating body 14 are in a pressure state between the negative pressure state and the atmospheric pressure state.

In this state, as the material to be processed P in the vicinity of the inner wall surface 2A and the lower opening 2b of the hopper 2 is stirred by the stirring blade 3A of the stirring mechanism 3, the material to be processed P crushed by the shearing action of the stirring blade 3A flows down to the lower opening 2b.

The material to be processed P is supplied from the material to be processed supply port 7a of the volumetric quantitative supply mechanism 1 to the material to be processed accommodation chambers 14b of the measuring rotating body 14 via the introduction portion 11.

The material to be processed accommodation chambers 14b are rotated by the measuring rotating body driving motor M2 and thus quantitatively supply a predetermined amount of the material to be processed P supplied from the material to be processed supply port 7a to the material to be processed receiving portion 5 of the receiving space 4.

As illustrated in FIGS. 1A to 4, the forcible supply mechanism 10 is a mechanism which forcibly, continuously, and quantitatively supplies a predetermined amount of the material to be processed P quantitatively supplied from the quantitative supply mechanism 1 to the receiving space 4 in the casing 7 to the suction stirring pump 50 (the suction stirring mechanism Y) on the downstream side via the material to be processed delivery port 7b.

Specifically, the forcible supply mechanism 10 includes the screw 9, which is disposed across the material to be processed receiving portion 5 and the material to be processed delivery portion 6 in the casing 7 so as to be rotatable and has the helical blade portion 8 on the outer circumference, and screw driving motors M3 and M4 which rotatably drive the screw 9 about a rotation axis T.

As illustrated in FIGS. 2 and 3 the receiving space 4 is formed on the downstream side of the quantitative supply mechanism 1 in the casing 7 and is defined by the casing 7 so that the upstream side region in the receiving space 4 serves as the material to be processed receiving portion 5 and the downstream side region thereof serves as the material to be processed delivery portion 6.

The material to be processed receiving portion 5 is formed in an elongated tubular shape having a substantially U shape (in a transverse sectional view) having an opening at its upper portion, and the material to be processed delivery portion 6 is formed in an elongated cylindrical shape having a circular shape (in a transverse sectional view).

The inner diameter of the material to be processed delivery portion 6 is formed to be decreased toward the material to be processed delivery port 7b side sequentially along the outer diameter of a blade portion 8a of a large-diameter screw 9A and the outer diameter of a blade portion 8b of a small-diameter screw 9B.

The screw 9 coaxially includes the large-diameter screw 9A having the helical blade portion 8a on the outer circumference and the small-diameter screw 9B having the helical blade portion 8b on the outer circumference, the large-diameter screw 9A is disposed on the material to be processed receiving portion 5 side, and the small-diameter screw 9B is disposed on the material to be processed delivery portion 6 side.

Furthermore, a driving shaft 17 of the small-diameter screw 9B is flitted in a cylindrical driving shaft 18 of the large-diameter screw 9A so as to form a double shaft, and a part where the blade portion 8b of the small-diameter screw 9B is formed is disposed across the material to be processed delivery port 7b from a tip end portion 19 of the large-diameter screw 9A such that the large-diameter screw 9A and the small-diameter screw 9B are coaxially disposed and are configured to rotate relative to each other about the rotation axis T.

Therefore, the material to be processed P accommodated in the space between the threads of the helical blade portion 8a formed on the outer circumference of the large-diameter screw 9A can be delivered to the tip end portion 19 (the material to be processed delivery portion 6) of the large-diameter screw 9A by the rotation of the large-diameter screw 9A.

The material to be processed P delivered to the material to be processed delivery portion 6 by the rotation of the large-diameter screw 9A is accommodated in the space between the threads of the helical blade portion 8b formed on the outer circumference of the small-diameter screw 9B coaxially disposed across the material to be processed delivery port 7b from the tip end portion 19 of the large diameter screw 9A, and as the small-diameter screw 9B is rotated in the same direction as the large-diameter screw 9A, the material to be processed P is forcibly, continuously, and quantitatively supplied to the tip end portion (the material to be processed delivery port 7b) of the small-diameter screw 9B and is delivered to the suction stirring pump 50 side via the material to be processed delivery port 7b.

The rotation axis T of both the screws 9A and 9B and the rotation axis S of the measuring rotating body 14 of the quantitative supply mechanism 1 are set to be parallel to each other (in the example illustrated in FIG. 2, at an angle inclined by 45 degrees with respect to the horizontal direction).

Furthermore, the small-diameter screw 9B is configured to be independently rotatably driven about the rotation axis T by the screw driving motor M3 in a state of being fitted in the large-diameter screw 9A.

The large-diameter screw 9A in a state of having the small-diameter screw 9B fitted therein is configured to be independently rotatably driven about the rotation axis T as a pulley 21 is rotatably driven by the screw driving motor M4 in a state in which a pulley 20 rotatable about the rotation axis T formed integrally with the outer circumference of the large-diameter screw 9A and the pulley 21 rotatable about a rotation axis U are connected by a timing belt 22 in a transmission manner.

The rotation speeds of the large-diameter screw 9A and the small-diameter screw 9B are set so that the volume of the material to be processed P delivered by each of the large-diameter screw 9A and the small-diameter screw 9B per unit time is the same in the material to be processed delivery portion 6.

In this case, the outer diameter of the blade portion 8a of the large-diameter screw 9A is formed to have an outer diameter approximately twice the outer diameter of the blade portion 8b of the small-diameter screw 9B, and the rotation speed of the small-diameter screw 9B with respect to the rotation speed of the large-diameter screw 9A is set in consideration of the distance between the threads of the blade portion 8a and the distance between the threads of the blade portion 8b in a direction along the driving shafts 17 and 18 so that the volume of the material to be processed delivered by the large-diameter screw 9A and the small-diameter screw 9B per unit time is the same.

In this embodiment, the outer diameter of the blade portion 8a of the large-diameter screw 9A is set to 34 mm, the outer diameter of the driving shaft 18 is set to 18 mm, the outer diameter of the blade portion 8b of the small-diameter screw 9B is set to 18 mm, the outer diameter of the driving shaft 17 is set to 6 mm, the maximum inner diameter and the minimum inner diameter of the material to be processed delivery portion 6 are respectively set to 35 mm and 22 mm, and the rotation speed of the small-diameter screw 9B is set to two to three times the rotation speed of the large-diameter screw 9A.

Dispersion Medium Supply Device 70

Figure 4:
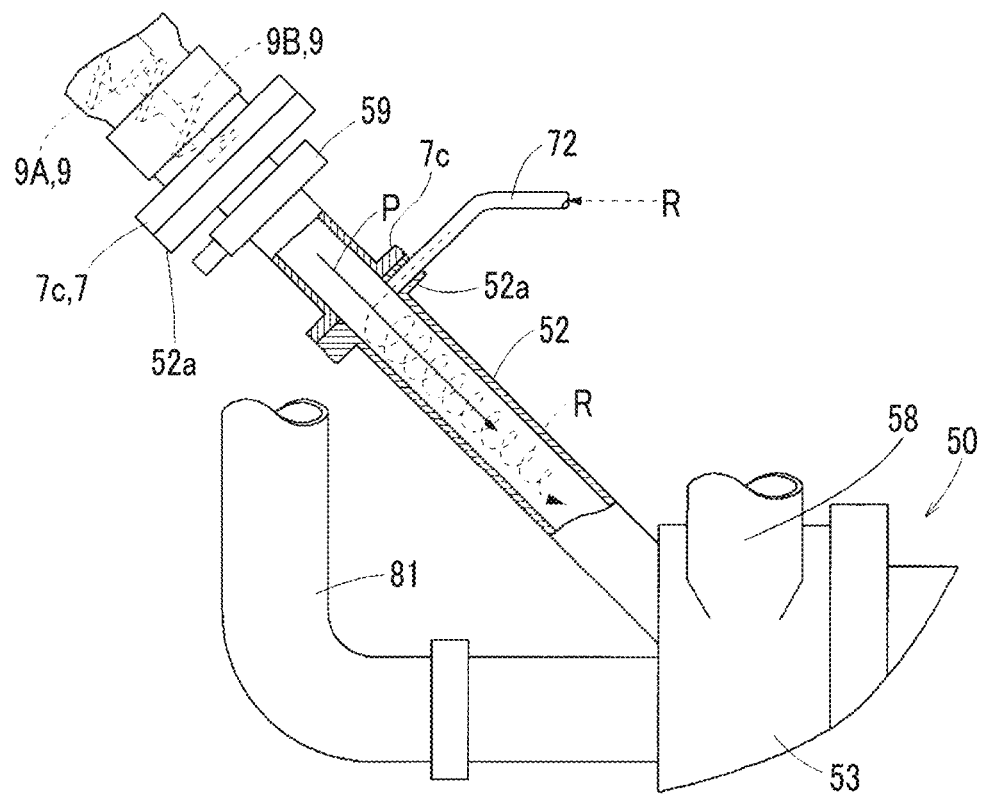
FIG. 4 is a partially cutaway sectional view illustrating a schematic configuration of a suction mixing portion.

As illustrated in FIGS. 1A and 4, the dispersion medium supply device 70 is configured to continuously and quantitatively supply the dispersion medium R from a dispersion medium source 71 to the mixing nozzle 52 of the suction stirring pump 50.

Specifically, the dispersion medium supply device 70 is configured to include the dispersion medium source 71 which supplies the dispersion medium R, a flow meter and a flow rate adjusting valve (not illustrated) which adjust the flow rate of the dispersion medium R from the dispersion medium source 71 to a set amount, and a pipeline 72 through which the dispersion medium R adjusted to the set amount is supplied into the suction stirring pump 50 via the mixing nozzle 52.

Suction Stirring Mechanism Y

As illustrated in FIGS. 1A to 5, the suction stirring mechanism Y is configured to include the suction stirring pump 50 for suctioning, stirring, and mixing the material to be processed P supplied from the quantitative supply mechanism X and the dispersion medium R supplied from the dispersion medium supply device 70, and the separation device 80.

In the quantitative supply mechanism X, the material to be processed delivery port 7b of the casing 7 is connected to the mixing nozzle 52 (an example of the suction mixing portion) which is the primary side of the suction stirring pump 50.

Figure 5:
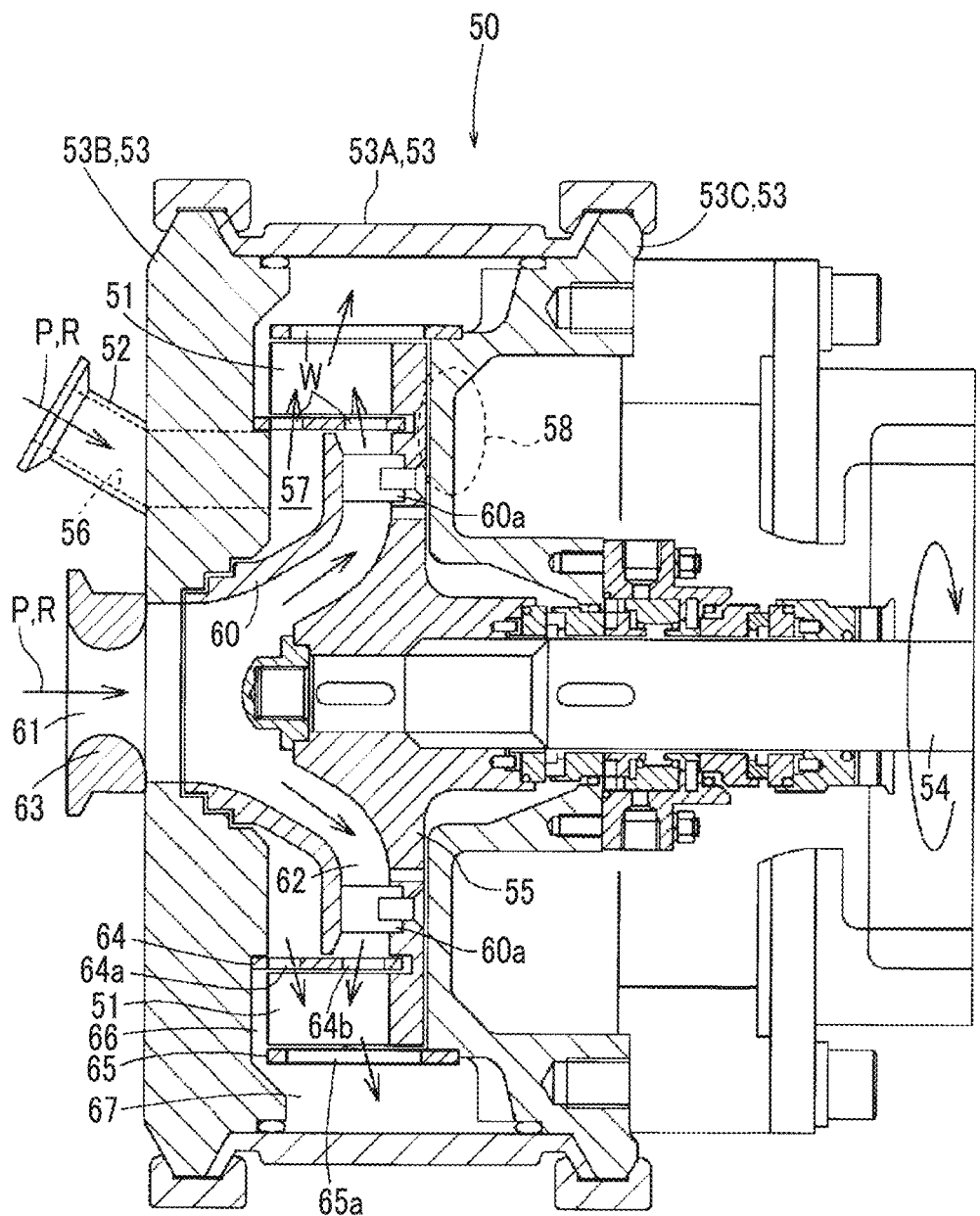
FIG. 5 is a partial enlarged sectional view illustrating a main part of a suction stirring pump.

As illustrated in FIG. 5, the suction stirring pump 50 includes a cylindrical body casing 53 53 provided with a cylindrical portion 53A, a front surface sealing portion 53B disposed on the front side of the cylindrical portion 53A (on the left in FIG. 5), a rear surface sealing portion 53C disposed on the rear side of the cylindrical portion 53A (on the right in FIG. 5).

Inside the body casing 53, a plurality of rotating blades 51 protrude from the outer circumferential portion of a rotor 55 attached to a driving shaft 54 of a pump driving motor M5, and the rotating blades 51 are rotated in a blade chamber 66 along with the rotor 55.

The material to be processed P and the dispersion medium R are suctioned from a first suction portion 56 into a first introduction chamber 57 by the negative pressure suction force generated by the rotation of the rotating blades 51 and are stirred, and the mixed liquid is discharged from a discharge portion 58 via the blade chamber 66 and a discharge chamber 67 formed on the outside thereof.

In addition, the first suction portion 56 is formed to penetrate through the front surface sealing portion 53B, and the discharge portion 58 is formed to penetrate through the cylindrical portion 53A.

The first suction portion 56 of the suction stirring pump 50 is provided with the mixing nozzle 52 having a straight tube shape which is connected to the material to be processed delivery port 7b of the casing 7, communicates with receiving space 4, and is configured to initially mix the material to be processed P quantitatively supplied from the material to be processed delivery port 7b with the dispersion medium R quantitatively supplied from the dispersion medium supply device 70 and then introduce the mixture into the first suction portion 56.

In the mixing nozzle 52, a shutter valve 59 (closing means) capable of stopping the supply of the material to be processed P to the first suction portion 56 of the suction stirring pump 50 is disposed between the material to be processed delivery port 7b and the first suction portion 56.

The pipeline 72 of the dispersion medium supply device 70 is connected to the mixing nozzle 52 between the shutter valve 59 and the first suction portion 56.

The discharge direction of the dispersion medium R from the pipeline 72 is set substantially in parallel to the tangential direction of the mixing nozzle 52 in a transverse sectional view of the mixing nozzle 52 to enable the dispersion medium R to be supplied along the inner circumferential surface (not illustrated) of the mixing nozzle 52. As illustrated in FIG. 4, the dispersion medium R is subjected to negative pressure suction into the suction stirring pump 50 while drawing a helical trajectory along the inner wall surface of the mixing nozzle 52.

Simultaneously, the material to be processed P quantitatively supplied via the material to be processed delivery port 7b of the casing 7 is subjected to negative pressure suction in the mixing nozzle 52 linearly into the suction stirring pump 50 along the cylindrical axis of the mixing nozzle 52.

Accordingly, the dispersion medium R is supplied from the pipeline 72 of the dispersion medium supply device 70 to the mixing nozzle 52 while swirling and the material to be processed P is quantitatively supplied from the quantitative supply mechanism 1 by the negative pressure suction force from the first suction portion 56 of the suction stirring pump 50. Therefore, after initial mixing of the material to be processed P and the dispersion medium R is favorably performed, the mixture is suctioned from the first suction portion 56 of the suction stirring pump 50, and stirring and mixing of the material to be processed P and the dispersion medium R in the suction stirring pump 50 is smoothly performed.

In the rotor 55, on the inner circumferential side of the rotating blades 51, a funnel-shaped partition plate 60 is disposed so as to rotatable about the driving shaft 54 via a plurality of bosses 60a.

The partition plate 60 separates the first introduction chamber 57 into which the material to be processed P and the dispersion medium R initially mixed in the mixing nozzle 52 are introduced from the first suction portion 56, from a second introduction chamber 62 into which a portion of the mixed liquid discharged from the discharge portion 58 is circulated and introduced via a second suction portion 61, and the sliding portion between the partition plate 60 and the front surface sealing portion 53B has a stepped labyrinth structure.

To the discharge portion 58 of the suction stirring pump 50, one end of a circulation passage 81 in the separation device 80, which separates the mixed liquid with specific gravity to be supplied into the circulation passage 81 and a discharge passage 82, is connected.

The other end of the circulation passage 81 is connected to the second suction portion 61 formed to pass through the front surface sealing portion 53B.

The second suction portion 61 is provided with a throttle portion 63 which limits the flow rate of the mixed liquid flowing thereinto.

In the front surface sealing portion 53B, on the inner circumferential side of the blade chamber 66 in which the rotating blades 51 are rotated, a first stator 64 which is cylindrical is disposed to be positioned between the blade chamber 66 and the first and second introduction chambers 57 and 62, and a throttle passage W is formed by through-holes 64a and 64b formed in the first stator 64.

The through-hole 64a which is circular is formed on the front surface side corresponding to the first introduction chamber 57, and the through-hole 64b which has an elongated hole shape is formed on the rear surface side corresponding to the second introduction chamber 62.

In addition, the throttle passage W can also be formed by a slit or a nozzle instead of the through-hole.

In the rear surface sealing portion 53C, on the outer circumferential side of the blade chamber 66 in which the rotating blades 51 are rotated, a second stator 65 which is cylindrical is disposed to be positioned between the blade chamber 66 and the discharge chamber 67 provided with the discharge portion 58, and the throttle passage W is formed by a through-holes 65a (slit-like elongated hole) formed in the second stator 65.

Accordingly, when the mixed liquid passes through the through-holes 64a, 64b, and 65a of the throttle passage W, stirring and mixing of the material to be processed P and the dispersion medium R can be promoted by the shearing action of the rotating blades 51.

Here, when the rotating blades 51 are rotated, the mixed liquid of the material to be processed P and the dispersion medium R is forced to flow to the discharge portion 58 via the blade chamber 66 and the discharge chamber 67 from the first and second introduction chambers 57 and 62. However, the flow rate of the mixed liquid that is forced to flow through the second introduction chamber 62 via the second suction portion 61 is limited when passing through the throttle portion 63 provided in the second suction portion 61.

In this state, the rotation of the rotating blades 51 is controlled, and the flow rate (for example, 15 m$^3$/Hr) of the mixed liquid flowing into the second introduction chamber 62 through the throttle portion 63 of the second suction portion 61 is set to be smaller than the flow rate of the mixed liquid (for example, 30 m$^3$/Hr) flowing into the discharge portion 58 from the second introduction chamber 62, so that the first and second introduction chambers 57 and 62 can be set to a negative pressure state (about −0.09 MPa).

Therefore, the inside of the mixing nozzle 52 and the inside of the receiving space 4 of the casing 7 can be set to a negative pressure state (for example, about −0.09 MPa) by rotating the rotating blades 51.

The separation device 80 is configured to separate the mixed liquid in a cylindrical container 83 with specific gravity, and is configured to separate the dispersion medium R in which the material to be processed P discharged from the discharge portion 58 of the suction stirring pump 50 is dispersed (the mixed liquid) to supply the dispersion medium R containing the material to be processed P which is incompletely dispersed to the circulation passage 81 and supply the dispersion medium R in which the material to be processed P is almost completely dispersed to the discharge passage 82.

One end of the circulation passage 81 connected to the lower portion of the cylindrical container 83 is connected to the discharge portion 58 of the suction stirring pump 50 via the plasma generating mechanism Z, and the other end thereof is connected to the second suction portion 61.

The discharge passage 82 connected to the upper portion of the cylindrical container 83 is connected to a supply destination 84 of the mixed liquid (product).

Although not illustrated in the figure, the separation device 80 is configured so that an introduction pipe connected to the circulation passage 81 is disposed to protrude from the bottom surface of the cylindrical container 83 toward the inside, a discharge portion connected to the discharge passage 82 is provided at the upper portion of the cylindrical container 83, a circulation portion connected to the circulation passage 81 is provided at the lower portion thereof, and a twist plate for turning the flow of the mixed liquid discharged from the introduction pipe is disposed at the discharge upper end of the introduction pipe.

In-Liquid Plasma Generating Mechanism

However, among the material to be processed P, the dispersion medium R, and the dispersion medium R in which the material to be processed P is dispersed (the mixed liquid), the dispersion medium R containing the material to be processed P which is incompletely dispersed is stirred and mixed while being subjected to the shearing action by passing through the through-holes 64a and 64b of the first stator 64 and the through-hole 65a formed in the second stator 65 disposed on the inside and the outside of the rotating blades 51 (the throttle passage W) and is discharged from the discharge portion 58.

Here, dispersion can be promoted by cavitation caused in the mixed liquid passing through the first and second introduction chambers 57 and 62 and the throttle passage W in the negative pressure state, expansion of bubbles contained in the mixed liquid, and corresponding impacts.

In addition, on the upstream side of the separation device 80, that is, between the discharge portion 58 of the suction stirring pump 50 and the separation device 80, the plasma generating mechanism Z which generates a plasma in bubbles formed due to the cavitation in the mixed liquid of the material to be processed P and the dispersion medium R is provided.

As illustrated in FIG. 1B, the plasma generating mechanism Z includes a pipeline 91 which connects the discharge portion 58 of the suction stirring pump 50 to the circulation passage 81 connected to the separation device 80, electrodes 92 made of a metal such as copper or tungsten, and a power source 93 for applying a pulse voltage between the electrodes 92.

In the plasma generating mechanism Z, bubbles formed due to the cavitation by applying a pulse voltage between the electrodes 92 by the power source 93, and bubbles formed when an electric field is concentrated at the tip ends of the electrodes 92 and thus the mixed liquid of the material to be processed P and the dispersion medium R in the vicinity thereof is subjected to Joule heating and are boiled and vaporized, grow and/or gather thereby forming a bubble region having a suitable size.

In the insulating bubble region, the vaporized material is ionized (turned into a plasma) by a high voltage dielectric breakdown discharge by the pulse voltage and an in-liquid plasma is generated.

The discharge generated by the pulse voltage is preferably a glow discharge, and the in-liquid plasma processing can be performed at a low temperature.

By the in-liquid plasma processing, hydroxyl groups, oxygen radicals, and the like are generated in the mixed liquid, and these hydroxyl groups, oxygen radicals, and the like adhere to the surface of the material to be processed P to modify the material to be processed P to have an affinity (specifically, for example, hydrophilicity) with the dispersion medium R, so that the material to be processed P and the dispersion medium R having no affinity with each other can be mixed without the use of a dispersant (the material to be processed P is uniformly dispersed in the dispersion medium R).

Next, the operation of the dispersion apparatus for the material to be processed will be described.

First, in a state in which the quantitative supply mechanism X is stopped and the shutter valve 59 is closed to stop suctioning of the material to be processed P via the mixing nozzle 52, by rotating the rotating blades 51 while supplying only the dispersion medium R from the dispersion medium supply device 70, the operation of the suction stirring pump 50 is started.

When a predetermined operation time has elapsed and the inside of the suction stirring pump 50 is set to a negative pressure state (for example, a vacuum state at about −0.09 MPa), the shutter valve 59 is opened.

Accordingly, the inside of the mixing nozzle 52 and the receiving space 4 of the casing 7 are set to a negative pressure state (for example, about −0.09 MPa), and the inside of the introduction portion 11 and the vicinity of the lower opening 2b of the hopper 2 are set to a pressure state between the negative pressure state and the atmospheric pressure state.

In addition, by operating the quantitative supply mechanism X, the material to be processed P stored in the hopper 2 is caused to flow down to the quantitative supply mechanism 1 from the lower opening 2b of the hopper 2 by the stirring action of the stirring blade 3A and the negative pressure suction force of the suction stirring pump 50.

As described above, the quantitative supply mechanism 1 continuously and quantitatively supply, to the material to be processed receiving portion 5 of the receiving space 4, a predetermined amount of the material to be processed P flowing down to the measuring rotating body 14 from the lower opening 2b.

By the operation of the quantitative supply mechanism X, the forcible supply mechanism 10 is set to an operating state such that the material to be processed P quantitatively supplied to the material to be processed receiving portion 5 is delivered to the material to be processed delivery portion 6 by the rotation of the large-diameter screw 9A and is forcibly, continuously, and quantitatively supplied into the mixing nozzle 52 sequentially from the material to be processed delivery portion 6 via the material to be processed delivery port 7b by the rotation of the small-diameter screw 9B.

The amount of the material to be processed P quantitatively supplied from the quantitative supply mechanism 1 and the amount of the material to be processed P quantitatively supplied to the mixing nozzle 52 by the forcible supply mechanism 10 are substantially the same.

On the other hand, the dispersion medium R is quantitatively supplied from the pipeline 72 of the dispersion medium supply device 70 by the negative pressure suction force of the suction stirring pump 50.

Accordingly, the material to be processed P and the dispersion medium R are always quantitatively supplied by the forcible extrusion by the forcible supply mechanism 10 and the negative pressure suction force of the suction stirring pump 50, and can be supplied into the suction stirring pump 50 after being initially mixed in the mixing nozzle 52 in a favorable manner.

The material to be processed P and the dispersion medium R which are initially mixed are introduced into the first introduction chamber 57 from the first suction portion 56 of the suction stirring pump 50, are stirred and mixed while being subjected to the shearing action by passing through the through-hole 64a of the first stator 64 and the through-hole 65a formed in the second stator 65 disposed on the inside and the outside of the rotating blades 51 (the throttle passage W) and are discharged from the discharge portion 58.

Here, dispersion can be promoted by cavitation caused in the mixed liquid passing through the first and second introduction chambers 57 and 62 and the throttle passage W in the negative pressure state, expansion of bubbles contained in the mixed liquid, and corresponding impacts.

In the dispersion medium R in which the material to be processed P discharged from the discharge portion 58 is dispersed (the mixed liquid), the dispersion medium R containing the material to be processed P which is incompletely dispersed is introduced into the second introduction chamber 62 from the second suction portion 61 of the suction stirring pump 50 via the circulation passage 81, is stirred and mixed while being subjected to the shearing action by passing though the through-hole 64b of the first stator 64 and the through-hole 65a formed in the second stator 65 (the throttle passage W), and is discharged from the discharge portion 58.

The dispersion medium R in which the material to be processed P is almost completely dispersed is supplied to the supply destination 84 via the discharge passage 82.

In this case, as the stirring and mixing of the material to be processed P and the dispersion medium R progress, when the concentration and the viscosity of the mixed liquid increase inside the suction stirring pump 50, and particularly inside the mixing nozzle 52, the mixed liquid at a high concentration or the mixed liquid at a high viscosity may block the mixing nozzle 52, and it may become difficult to exert the negative pressure suction force from the suction stirring pump 50 on the receiving space 4. However, even in this case, the material to be processed P is forcibly, continuously, and quantitatively supplied from the receiving space 4 to the mixing nozzle 52 by the forcible extrusion by the forcible supply mechanism 10, and thus the material to be processed P can be reliably and quantitatively supplied into the suction stirring pump 50.

Therefore, the quantitative supply of the material to be processed P into the mixing nozzle 52 and the suction stirring pump 50 can be performed always in a stable state, and the mixed liquid in the suction stirring pump 50 can be set to a more uniformly dispersed state and can be more rapidly stirred and mixed to a desirable concentration.

Moreover, even in a case where clogging or the like in the mixing nozzle 52 occurs, by continuously performing the quantitative supply of the material to be processed P into the suction stirring pump 50, the material to be processed P and the dispersion medium R can be more reliably and rapidly stirred and mixed to a desirable concentration while being sequentially and uniformly dispersed without variations in the suction stirring pump 50.

When a predetermined amount of the material to be processed P is supplied, the shutter valve 59 is closed to block the negative pressure suction of the material to be processed P.

Furthermore, when a predetermined amount of the dispersion medium R is supplied, the operation of the dispersion medium supply device 70 is stopped.

Thereafter, the operation of the suction stirring pump 50 is continuously performed until the material to be processed P is completely dispersed in the dispersion medium R.

In the dispersion apparatus for the material to be processed, the in-liquid plasma processing is performed by the plasma generating mechanism Z provided on the upstream side of the separation device 80, that is, between the discharge portion 58 of the suction stirring pump 50 and the separation device 80 to generate a plasma in bubbles formed due to the cavitation in the mixed liquid of the material to be processed P and the dispersion medium R.

By the in-liquid plasma processing hydroxyl groups, oxygen radicals, and the like are generated in the mixed liquid, and these hydroxyl groups, oxygen radicals, and the like adhere to the surface of the material to be processed P to modify the material to be processed P to have an affinity (specifically, for example, hydrophilicity) with the dispersion medium R, so that the material to be processed P and the dispersion medium R having no affinity with each other can be mixed without the use of a dispersant (the material to be processed P is uniformly dispersed in the dispersion medium R).

EXAMPLES

Next, in order to confirm the action of the dispersion apparatus for the material to be processed, in-liquid plasma processing was performed using the dispersion apparatus for the material to be processed with water (the dispersion medium R) under the following conditions.

Figure 6:
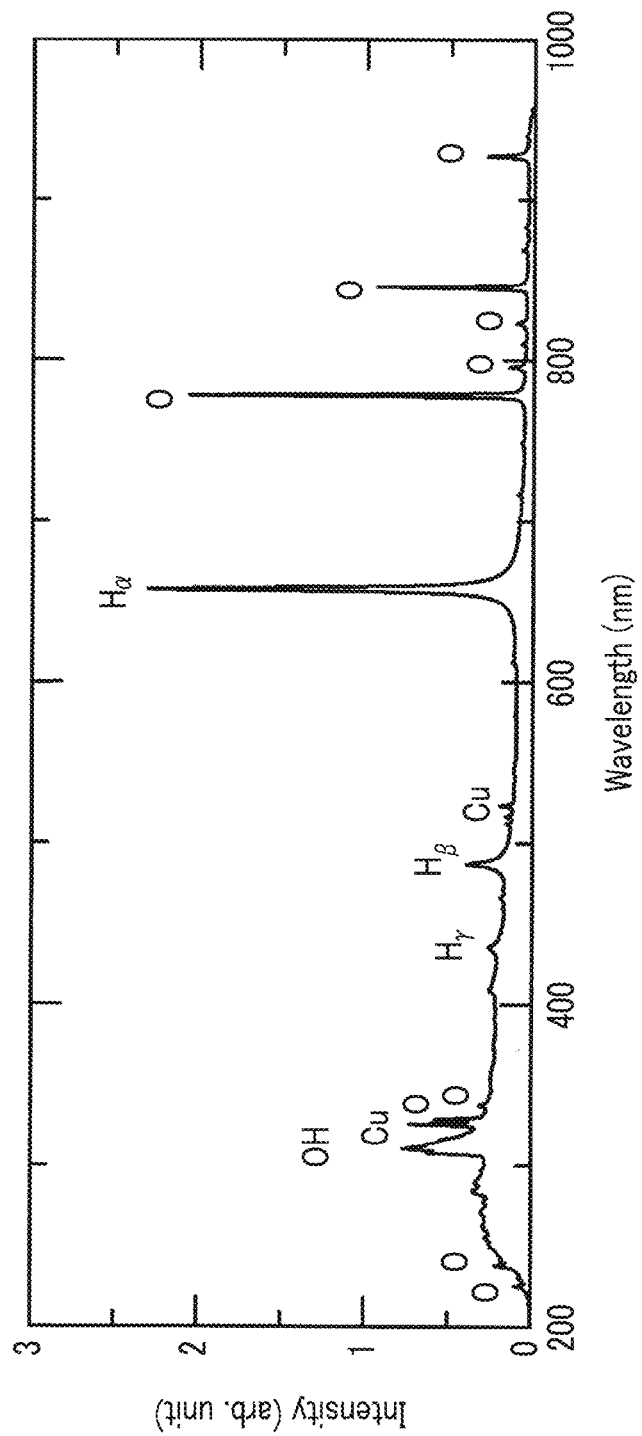
FIG. 6 is a graph showing an analysis result of an emission spectrum of water subjected to in-liquid plasma processing.

The analysis result of the emission spectrum is shown in FIG. 6.

Experimental Conditions
 Plasma Emission Spectroscopy
 Measuring instrument: plasma process monitor (C7460, manufactured by Hamamatsu Corporation)
 Exposure time: 20 ms
 Number of integration: 100 times
 Measurement time: 2 s (=20 ms×100 times)
 Operation Conditions of the Dispersion Apparatus for the Material to be Processed
 Rotation speed: 4800 rpm (frequency: 80 Hz, decompression: −0.092)
 Chiller water temperature: 10° C.
 Dispersion medium: deionized water
 Amount of dispersion medium: 1 L (with aeration)
 Conditions for In-Liquid Plasma Processing
 Power source voltage: 150 V
 Power source current: 4 A
 Frequency: 40 kHz
 Pulse width: 2.0
 Electrode material: copper
 Inter-electrode distance: 1.0 mm
 Inter-electrode voltage: 1 kV (peak value)
 Inter-electrode current: 4 A (peak value)

As shown in FIG. 6, it was confirmed that hydroxyl groups, oxygen radicals, and the like were generated in the liquid by generating a plasma by the plasma generating mechanism.

Next, a mixture of CNT (carbon nanotubes) and CMC (carboxymethyl cellulose) as the material to be processed P and water as the dispersion medium R were dispersed under the same conditions as described above using the dispersion apparatus for the material to be processed, and the resultant was applied to a substrate using a doctor blade method.

Figure 7:
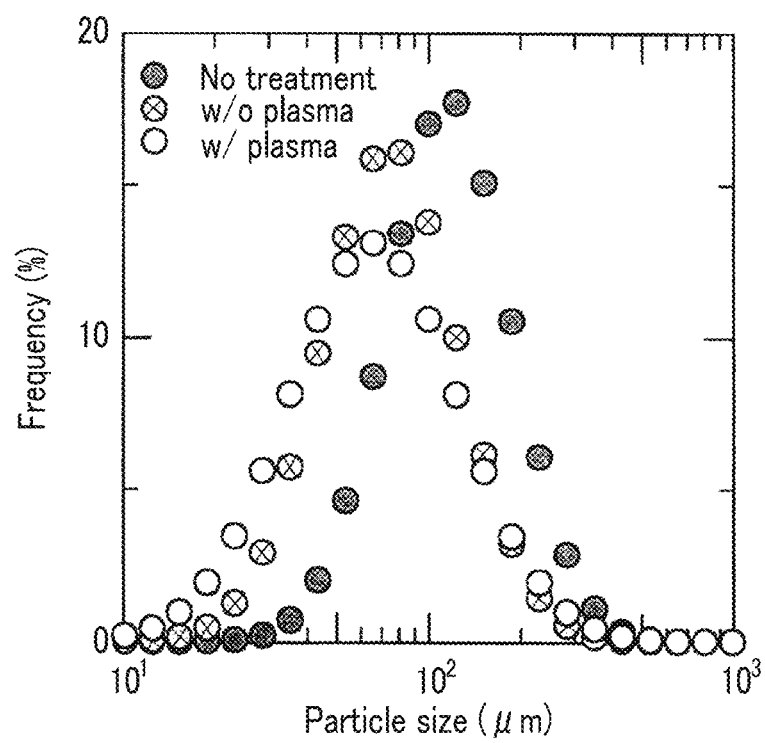
FIG. 7 is a graph showing an analysis result of a dispersed state of a material to be processed.
Figure 8:
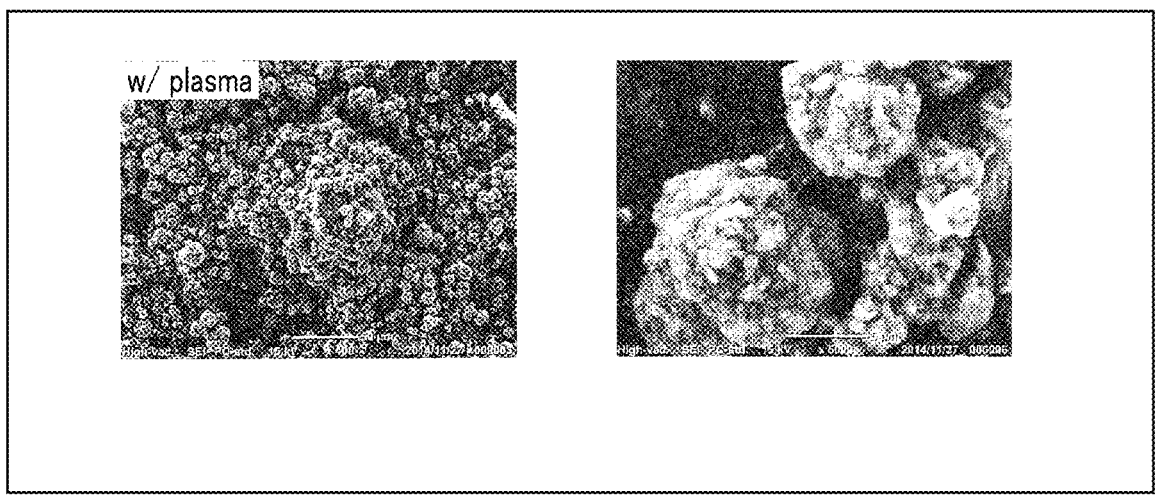
FIG. 8 is a photograph showing the dispersed state of the material to be processed.

The analysis result of the dispersed state of the material to be processed is shown in FIG. 7, and a photograph of the dispersed state of the material to be processed is shown in FIG. 8.

CNT/CMC Sample
CNT CMC=7:5 (weight ratio)
Solid content: 2 wt %
Substrate: Al current collector (roughened)
Application method: doctor blade method
Drying temperature: 70° C.

As shown in FIG. 7, it was confirmed that the particle size was reduced and uniform dispersion was achieved in the order of without cavitation and in-liquid plasma processing (No treatment), with cavitation and without in-liquid plasma processing (w/o plasma), and with cavitation and in-liquid plasma processing (w/plasma).

Figure 9:
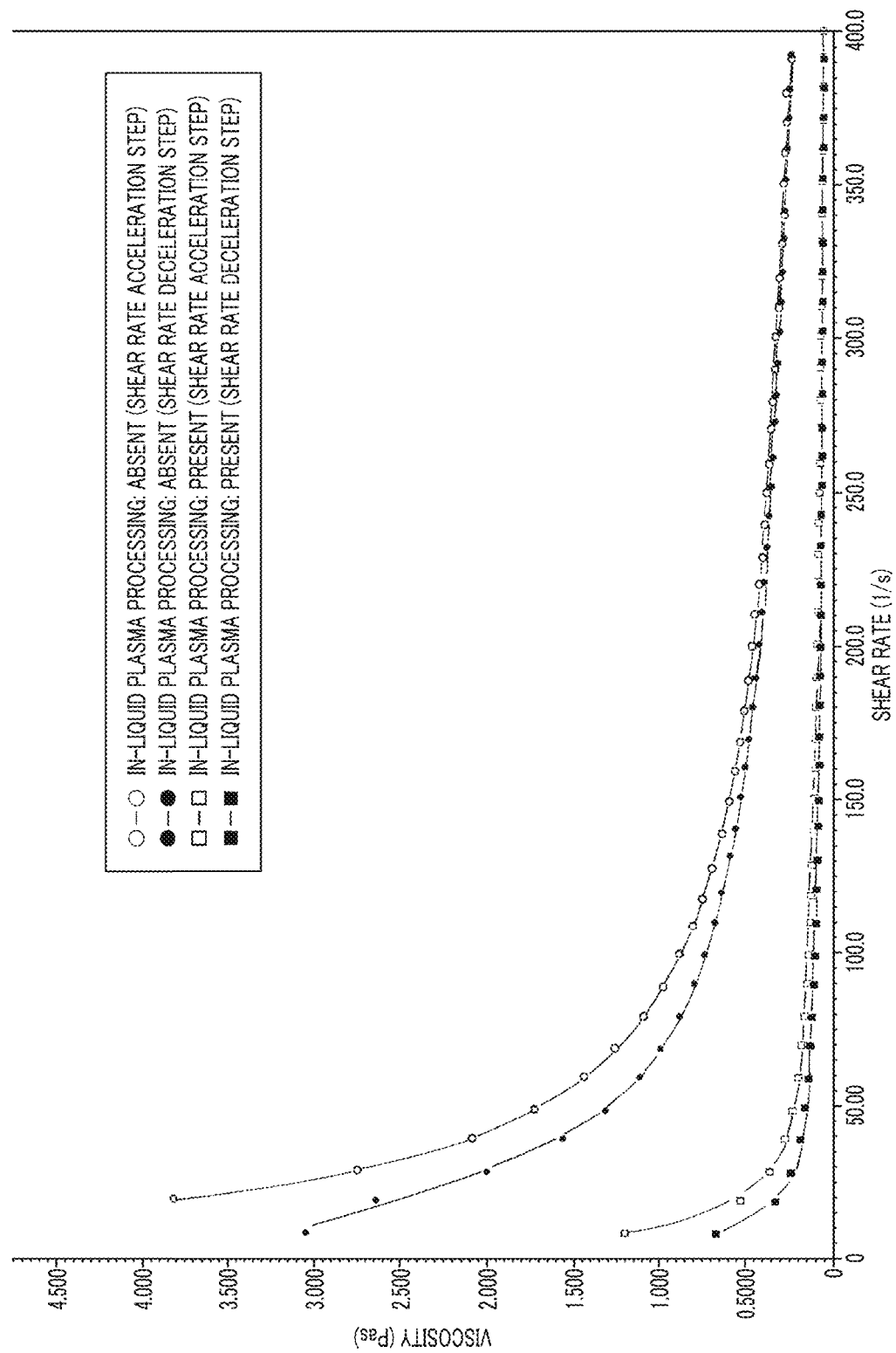
FIG. 9 is a graph showing the relationship between the shear rate and the viscosity of a slurry showing the dispersed state of the material to be processed.

Experimental Conditions
Operation Conditions of the Dispersion Apparatus for the Material to be Processed
Rotation speed: 7200 rpm
Chiller water temperature and amount: 5° C., 1400 L/h
Dispersion medium: deionized water
Amount of dispersion medium: 650 g (in the case of titanium oxide), 905 g (in the case of boron nitride)
Circulation time: 5 minutes
Conditions for In-Liquid Plasma Processing
Power source voltage: 200 V
Frequency: 60 kHz (1.5 µs)
Electrode material: copper
Inter-electrode distance: 2.0 mm Under the above conditions, the results of the experiments conducted with titanium oxide as the material to be processed P and water as the dispersion medium R and with or without in-liquid plasma processing (Test (1): present, Test (2): absent) (the relationship between the concentration of titanium oxide and the degree of decompression, the current value of the pump driving motor M5, and the slurry state) are shown in Table 1, and the relationship between the shear rate and the viscosity of the obtained slurry is shown in FIG. 9.

TABLE 1

| Test (1) in-liquid plasma processing: present | | | | Test (2) in-liquid plasma processing: absent | | | |
|---|---|---|---|---|---|---|---|
| Titanium oxide concentration (%) | Degree of decompression for five minutes of circulation (MPa) | Motor current value for five minutes of circulation (A) | Slurry state | Titanium oxide concentration (%) | Degree of decompression for five minutes of circulation (MPa) | Motor current value for five minutes of circulation (A) | Slurry state |
| 8.28 | −0.082 | — | Low viscosity | 8.49 | −0.080 | 6.90 | Low viscosity |
| 16.10 | −0.074 | — | | | | | |
| 23.14 | −0.070 | — | | | | | |
| 28.90 | −0.070 | — | | | | | |
| 34.40 | −0.066 | 10.10 | | 33.18 | −0.080 | 7.90 | Low viscosity |
| 39.36 | −0.066 | 10.20 | | | | | |
| 44.21 | −0.062 | 10.40 | | | | | |
| 49.12 * | −0.056 | 10.01 | | 48.33 | −0.080 | 8.60 | Started to become whipped cream |
| 55.32 | −0.050 | 9.90 | | 52.56 | −0.050 | 7.40 | Whipped cream |
| 63.54 | −0.066 | 11.35 | | | | | |
| 69.52 | −0.060 | 11.55 | | | | | |

* 50 g of deionized water is added

In addition, as shown in FIG. 8, it was confirmed that uniform dispersion of the material to be processed P could be performed by using the dispersion apparatus for the material to be processed (with cavitation and in-liquid plasma processing (w/plasma)).

Therefore, a material to be processed P other than the mixture of CNT (carbon nanotubes) and CMC (carboxymethyl cellulose), specifically, an inorganic compound, for example, one or two or more of titanium oxide, aluminum oxide, calcium carbonate, potassium nitride, boron nitride, and zirconium dioxide as the material to be processed P and water as the dispersion medium R can be dispersed using the dispersion apparatus for the material to be processed.

Hereinafter, as an example, an experiment in which the material to be processed P was titanium oxide or boron nitride, and the dispersion medium R was water will be described.

As shown in Table 1 and FIG. 9, it was confirmed that compared to the case where the in-liquid plasma processing was not performed uniform dispersion of titanium oxide as the material to be processed P was achieved by performing the in-liquid plasma processing and a low-viscosity slurry was obtained.

Here, the slurry prepared in Test (1) did not precipitate even after 24 hours and the slurry state was maintained.

Figure 10:
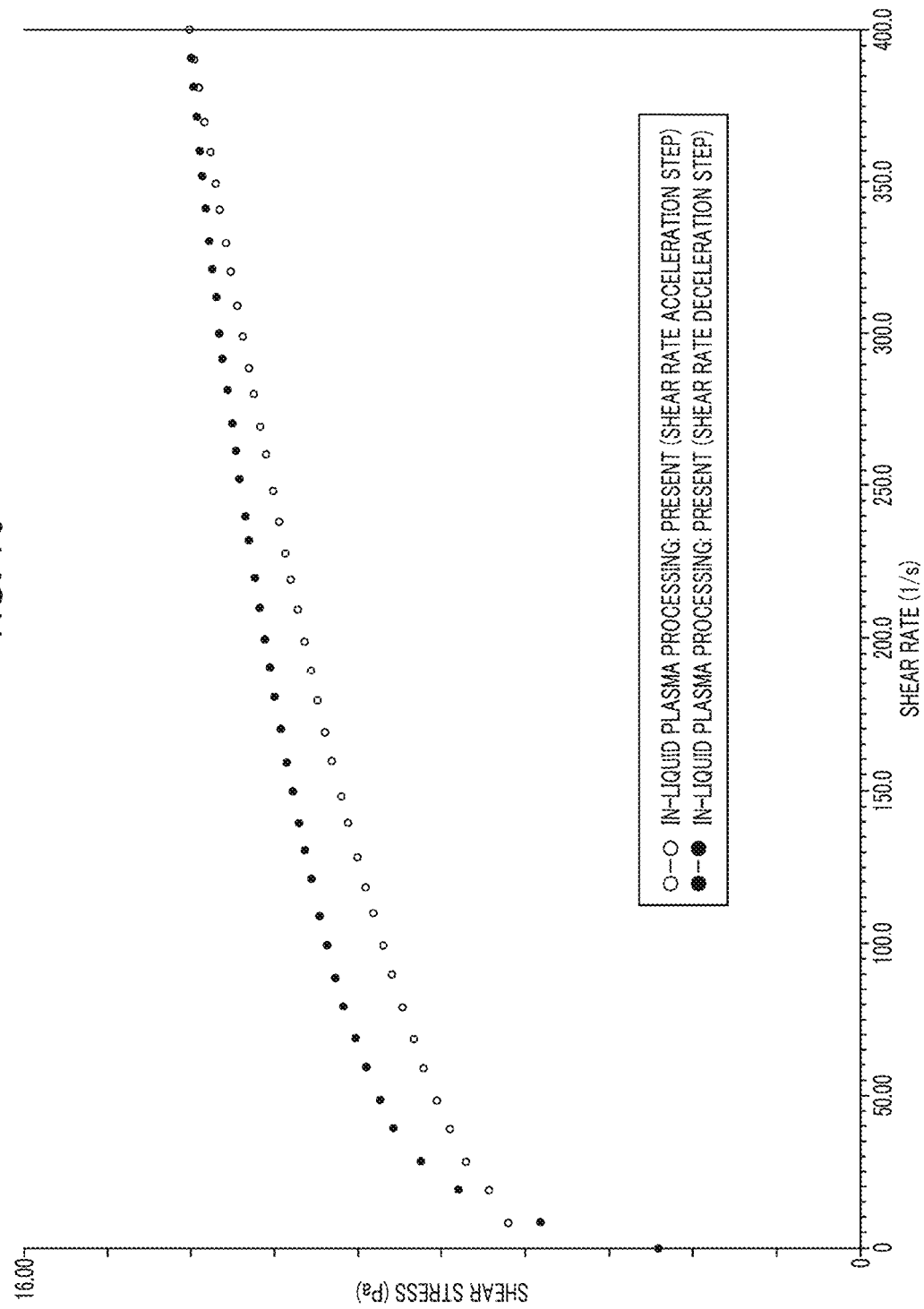
FIG. 10 is a graph showing the relationship between the shear rate and the shear stress of the slurry showing the dispersed state of the material to be processed.
Figure 11:
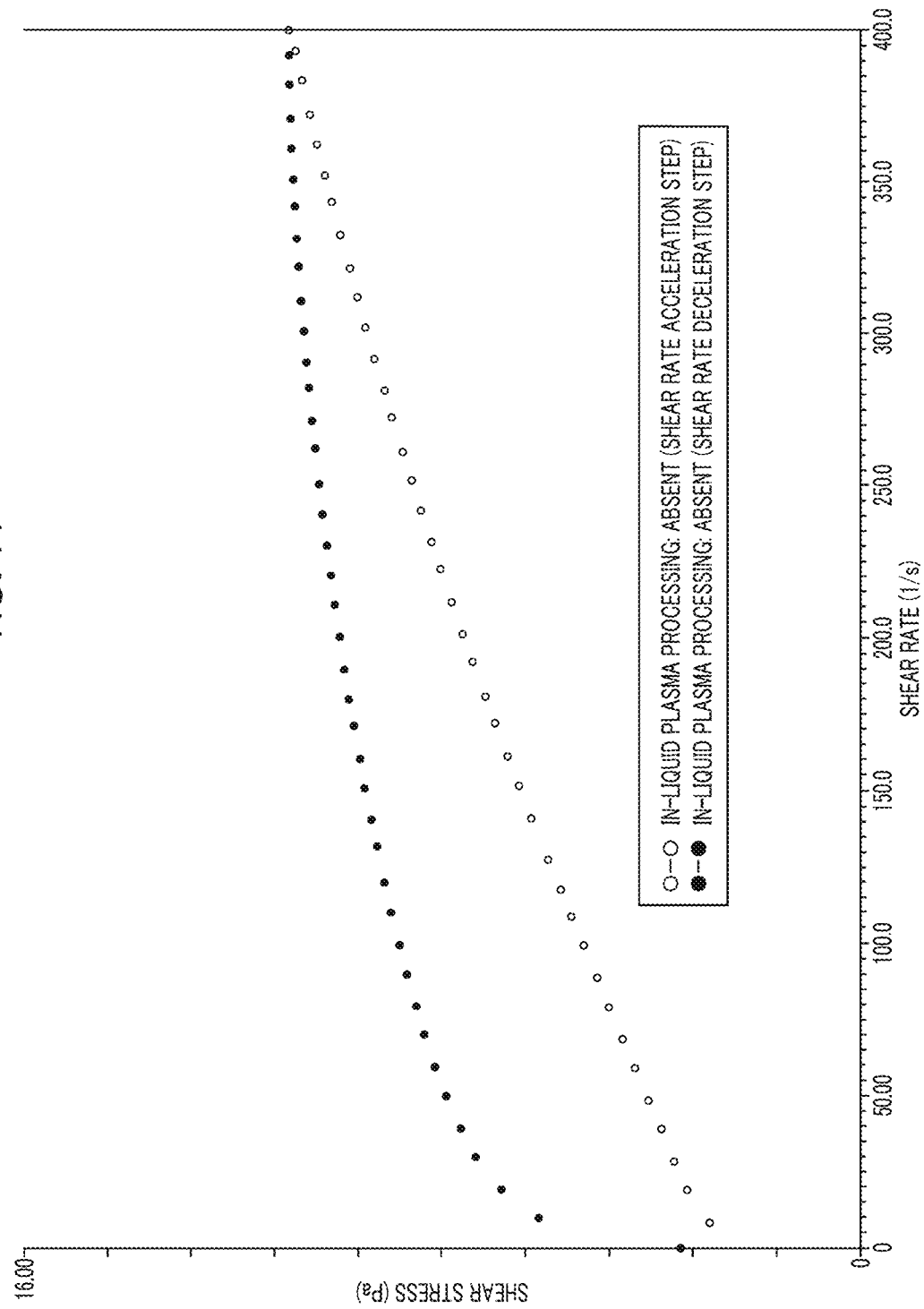
FIG. 11 is a graph showing the relationship between the shear rate and the shear stress of the slurry showing the dispersed state of the material to be processed.
Figure 12:
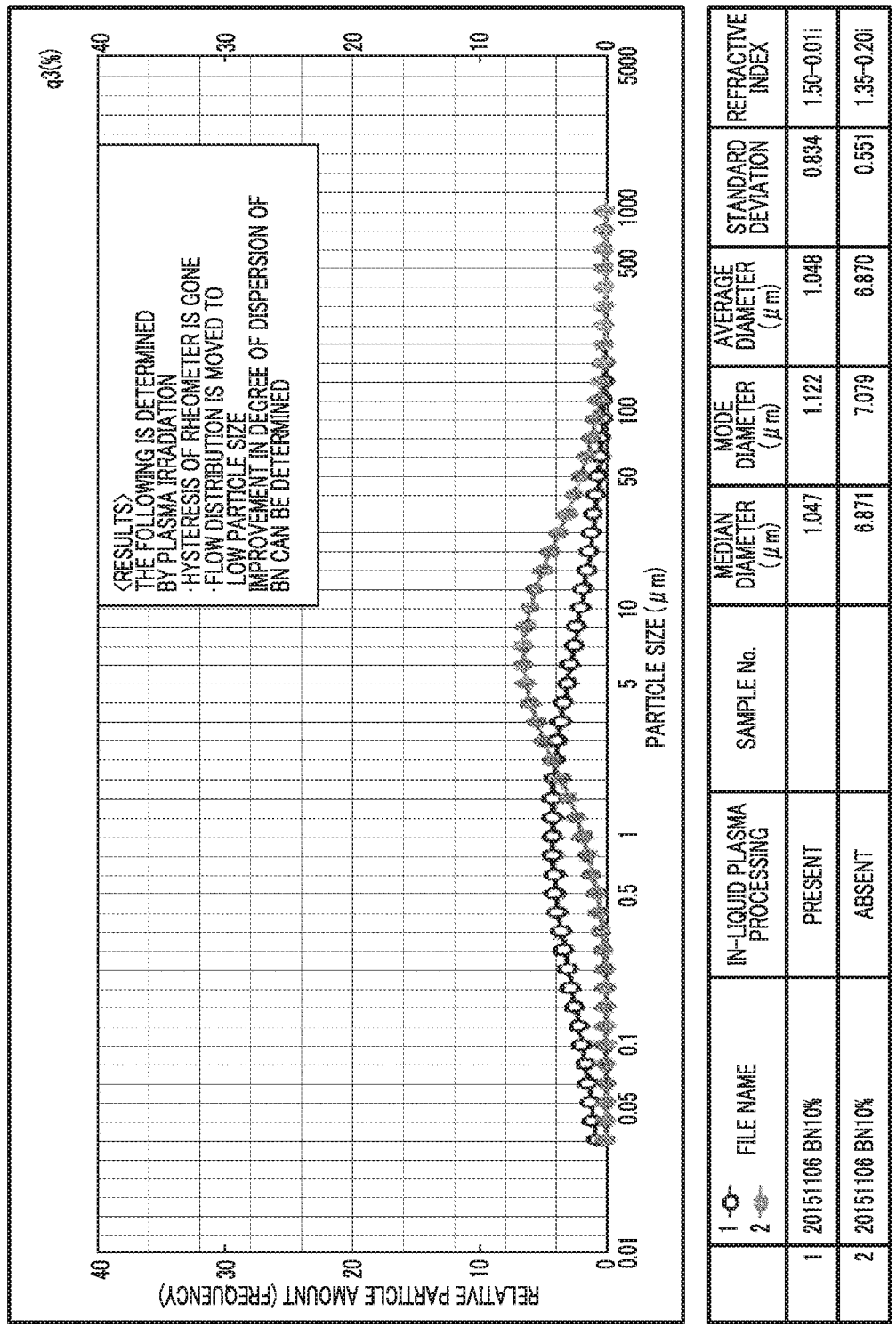
FIG. 12 is an explanatory view showing the specification values of particles contained in the slurry showing the dispersed state of the material to be processed.

Under the above conditions, as a result of conducting the experiments with boron nitride as the material to be processed P and water as the dispersion medium R and with or without the in-liquid plasma processing (the relationship between the concentration of boron nitride and the degree of decompression, the current value of the pump driving motor M5, and the slurry state) are shown in Table 2, the relationship between the shear rate and the shear stress of the obtained slurry is shown in FIGS. 10 and 11, and the specification values of boron nitride particles contained in the obtained slurry are shown in FIG. 12.

TABLE 2

| | Test: in-liquid plasma processing: absent | | | |
| --- | --- | --- | --- | --- |
| BN addition amount (g) | Degree of decompression for five minutes of circulation (MPa) | Motor current value for five minutes of circulation (A) | Temperature (° C.) | Slurry state |
| 20.0 | −0.052 | 8.39 | — | Low viscosity |
| 20.0 | −0.050 | 8.35 | — | |
| 20.0 | −0.052 | 8.66 | — | |
| 20.0 | −0.054 | 8.73 | — | |
| 17.8 | −0.055 | 8.83 | 27.1 | |

| | Test in-liquid plasma processing: present | | | |
| --- | --- | --- | --- | --- |
| Plasma time (min) | Degree of decompression for ten minutes of circulation (MPa) | Motor current value for ten minutes of circulation (A) | Temperature (° C.) | Slurry state |
| 10 | −0.052 | 8.16 | 45.2 | Low viscosity |

As shown in Table 2 and FIGS. 10 to 12, it was confirmed that compared to the case where the in-liquid plasma processing was not performed, uniform dispersion of boron nitride as the material to be processed P was achieved by performing the in-liquid plasma processing and the hysteresis was reduced.

Other Embodiments (1) In the above-described embodiment, the large-diameter screw 9A and the small-diameter screw 9B were used as the screw 9 of the forcible supply mechanism 10. However, the number of screws 9 may be appropriately changed according to the physical properties and the like of the material to be processed P.

For example, a configuration in which the inner diameter of the material to be processed delivery portion 6 is sequentially reduced toward the material to be processed delivery port 7*b* so that screws 9 with a large diameter, a medium diameter, and a small diameter are arranged is adopted, and the three screws with a large diameter, a medium diameter, and a small diameter may be coaxially arranged in the material to be processed delivery portion 6.

(2) In the above-described embodiment, the inner diameter of the material to be processed delivery portion 6 which is cylindrical is reduced toward the material to be processed delivery port 7*b* but is not limited to this configuration as long as the material to be processed P can be forcibly, continuously, and quantitatively supplied to the material to be processed delivery port 7*b* by arranging the screws 9 in the material to be processed delivery portion 6.

For example, it is also possible to form the inner diameter of the material to be processed delivery portion 6 to be substantially the same as or larger than the inner diameter of the material to be processed receiving portion 5.

In this case, it is also possible to form the opening area of the material to be processed delivery port 7*b* to be substantially the same as or larger than the inner diameter of the material to be processed receiving portion 5 as long as the negative pressure suction force can be appropriately exerted on the receiving space 4.

(3) In the above-described embodiment, the configuration using the measuring rotating body 14 as the volumetric quantitative supply mechanism 1 is exemplified. However, the quantitative supply mechanism 1 is not particularly limited to this configuration, and for example, a mechanism capable of quantitatively supplying the material to be processed P in the hopper 2 toward the downstream side from the lower opening 2*b* using a gear pump can also be adopted.

(4) In the above-described embodiment, the separation device 80 which separates the mixed liquid stirred and mixed in the suction stirring pump 50 to supply the dispersion medium R containing the material to be processed P which is incompletely dispersed to the circulation passage 81 and supply the dispersion medium R in which the material to be processed P is almost completely dispersed to the discharge passage 82 is provided. However, the separation device 80 may be omitted in a case where stirring and mixing can be properly performed in the suction stirring pump 50 in one batch.

In addition, the separation device 80 may adopt a configuration in which in a state where the material to be processed P and the dispersion medium R are stirred and mixed while the mixed liquid is sequentially circulated through the circulation passage 81, for example, in a case where the supply of a predetermined amount of the dispersion medium R is completed before stirring and mixing sufficiently progress, the mixed liquid is separated as being completely dispersed by the separation device 80 and the mixed liquid supplied to the supply destination 84 is supplied again via the pipeline 72 of the dispersion medium supply device 70 to be mixed again with the material to be processed P in the mixing nozzle 52.

(5) In the above-described embodiment, as the material to be processed P, the mixture of CNT (carbon nanotubes) and CMC (carboxymethyl cellulose) or the like is used. However, as necessary, a single kind of material to be processed may be used, or a mixed material to be processed in which a plurality of kinds of material to be processed are mixed may be used as the material to be processed P.

Likewise, although a single kind of water is used as the dispersion medium R, as necessary, a mixed liquid in which a plurality of kinds of liquid are mixed may also be used as the dispersion medium R.

(6) In the above-described embodiment, the plasma generating mechanism Z is provided on the upstream side of the separation device 80, that is, between the discharge portion 58 of the suction stirring pump 50 and the separation device 80. However, the plasma generating mechanism Z may be provided in an arbitrary region where bubbles are formed due to cavitation in the mixed liquid of the material to be processed P and the dispersion medium R, and for example, the electrode of the plasma generating mechanism Z may be provided in the discharge portion 67 of the suction stirring pump 50.

While the dispersion method and the dispersion apparatus for a material to be processed and the mixed liquid of a material to be processed and a dispersion medium produced thereby according to embodiments of the present invention have been described above on the basis of the embodiments, the present invention is not limited to the configurations described in the embodiments, and the configurations can be appropriately changed without departing from the gist.

The dispersion method and the dispersion apparatus for a material to be processed according to the embodiments of the present invention and the mixed liquid of the material to be processed and the dispersion medium produced thereby can mix the material to be processed and the dispersion medium having no affinity with each other using a single apparatus without the use of a dispersant and thus can be suitably used, as well as for mixing the material to be processed and the dispersion medium having no affinity with each other using a single apparatus without the use of a dispersant (for uniformly dispersing the material to be processed in the dispersion medium), for example, for a modification apparatus for the material to be processed.

It should be understood that the invention is not limited to the above-described embodiment, but may be modified into various forms on the basis of the spirit of the invention. Additionally, the modifications are included in the scope of the invention.

What is claimed is:

1. A dispersion apparatus comprising:
   a cavitation generator configured to:
      form, by stirring a material and a dispersion medium so as to mix the material with the dispersion medium, a mixed liquid, and
      form, by causing cavitation in the mixed liquid, bubbles in the mixed liquid; and
   a plasma generator configured to:
      generate, in the bubbles, a plasma,
   wherein the plasma generator is attached to an upper portion of the cavitation generator, the cavitation generator physically abuts the plasma generator.

2. The dispersion apparatus according to claim 1, wherein the cavitation generator comprises a throttle passage through which the mixed liquid passes.

3. The dispersion apparatus according to claim 2, wherein the throttle passage is formed by at least one of a slit, a nozzle or a through-hole formed in the cavitation generator.

4. The dispersion apparatus according to claim 1, wherein the cavitation generator comprises blades that stir and mix the material and the dispersion medium to cause the cavitation.

5. The dispersion apparatus according to claim 1, wherein the mixed liquid is circulated to the cavitation generator via a circulation passage.

6. The dispersion apparatus according to claim 1, further comprising:
   a separation device attached to the plasma generator,
   wherein the separation device is configured to separate a part of the mixed liquid in which the material is incompletely dispersed in the dispersion medium from the mixed liquid.

\* \* \* \* \*